US012767883B2

(12) United States Patent
Park et al.

(10) Patent No.: US 12,767,883 B2
(45) Date of Patent: Oct. 20, 2026

(54) METHOD FOR PREPARING METAL HALIDE NANOCOMPOSITES

(71) Applicants: FONDAZIONE ISTITUTO ITALIANO DI TECNOLOGIA, Genoa (IT); QUANTUM ADVANCED SOLUTIONS LTD, Southampton (GB)

(72) Inventors: Sungwook Park, Genoa (IT); Mai Ngoc An, Genoa (IT); Liberato Manna, Genoa (IT); Luca De Trizio, Genoa (IT); Marat Lutfullin, Southampton (GB); Lutfan Sinatra, Southampton (GB); Osman Mohammed Bakr, Southampton (GB)

(73) Assignees: FONDAZIONE ISTITUTO ITALIANO DI TECNOLOGIA, Genoa (IT); QUANTUM ADVANCED SOLUTIONS LTD, Southampton (GB)

( * ) Notice: Subject to any disclaimer, the term of this patent is extended or adjusted under 35 U.S.C. 154(b) by 710 days.

(21) Appl. No.: 18/018,097

(22) PCT Filed: Jul. 29, 2021

(86) PCT No.: PCT/IB2021/056931
§ 371 (c)(1),
(2) Date: Jan. 26, 2023

(87) PCT Pub. No.: WO2022/024037
PCT Pub. Date: Feb. 3, 2022

(65) Prior Publication Data

US 2023/0272270 A1 Aug. 31, 2023

(30) Foreign Application Priority Data

Jul. 29, 2020 (IT) ........................ 102020000018481

(51) Int. Cl.
*C09K 11/02* (2006.01)
*C08K 9/02* (2006.01)
(Continued)

(52) U.S. Cl.
CPC ................ *C09K 11/02* (2013.01); *C08K 9/02* (2013.01); *C09K 8/92* (2013.01); *C09K 11/665* (2013.01)

(58) Field of Classification Search
CPC ........ C09K 8/92; C09K 11/02; C09K 11/665; C09K 11/025
See application file for complete search history.

(56) References Cited

U.S. PATENT DOCUMENTS

2017/0153382 A1* 6/2017 Wang .................. C09K 11/025

FOREIGN PATENT DOCUMENTS

| | | |
|---|---|---|
| CN | 110 078 116 | 8/2019 |
| EP | 3 570 342 | 11/2019 |

OTHER PUBLICATIONS

International Search Report and Written Opinion corresponding to International Patent Application No. PCT/IB2021/056931, mailed Nov. 11, 2021.

(Continued)

*Primary Examiner* — Matthew E. Hoban
*Assistant Examiner* — Lynne Edmondson
(74) *Attorney, Agent, or Firm* — Lathrop GPM LLP; Malaika O.D. Tyson

(57) ABSTRACT

The invention relates to a method for the preparation of luminescent nanocomposites comprising metal halide nanocrystals co-embedded with inorganic salts in the pores of a porous metal oxide matrix comprising the steps of: a) preparing a mixture comprising at least a metal halide, a combination of inorganic salts, and porous metal oxide particles in the absence of an organic solvent; b) heating (Continued)

above the melting temperature of the mixture of step a); c) cooling to obtain the nanocomposite. It further relates to nanocomposites obtained with the claimed method and optoelectronic devices, tracers and tagging material comprising the same.

15 Claims, 7 Drawing Sheets

(51) Int. Cl.
*C09K 8/92* (2006.01)
*C09K 11/66* (2006.01)

(56) References Cited

OTHER PUBLICATIONS

Peng Chen et al., "In situ growth of ultrasmall cesium lead bromine quantum dots in a mesoporous silica matrix and their application in flexible light-emitting diodes." Nanoscale, vol. 11, No. 35, Jan. 1, 2019, pp. 16499-16507, XP055750687.
Dmitry N. Dirin et al., "Harnessing Defect-Tolerance at the Nanoscale: Highly Luminescent Lead Halide Perovskite Nanocrystals in Mesoporous Silica Matrixes", Nano Letters, vol. 16, No. 9, Aug. 23, 2016, pp. 5866-5874, XP055628160.

* cited by examiner

Insert: picture of the sample after 3 days immersed in acqua regia

METHOD FOR PREPARING METAL HALIDE NANOCOMPOSITES

CROSS-REFERENCE TO RELATED APPLICATIONS

The present application is filed pursuant to 35 U.S.C. 371 as a U.S. National Phase application of International Patent Application No. PCT/IB2021/056931, which was filed Jul. 29, 2021, claiming the priority benefit of Italian patent application no. 102020000018481 filed on Jul. 29, 2020. The entire text of the aforementioned applications is incorporated herein by reference in its entirety.

FIELD OF THE INVENTION

The present invention relates to a method for the preparation of luminescent nanocomposites with increase stability properties.

BACKGROUND OF THE INVENTION

Nanocrystals (NCs) of lead halide perovskites (LHPs) of $APbX_3$ (A=$CH_3NH_3$, HC(NH)$NH_2$, or Cs and X=halogen anion) have excellent optical properties which make them promising candidates for different optoelectronic applications such as light-emitting diodes and displays. These NCs are characterized by a high photoluminescence quantum yield (PLQY) and high color purity (narrow PL emission peaks).

However, these materials suffer from different drawbacks, with the main one being their poor stability under different conditions: when exposed to humidity, high temperature and photon irradiation. Indeed, LHPs are highly unstable in polar solvents and can be even degraded by the moisture present in the air. These problems have to be effectively solved in order to being able to fabricate highly performing devices based on LHP NCs.

Different strategies aiming at protecting LHPs have been developed and tested. LHPs NCs have been encapsulated in polymers, inorganic matrixes (e.g., $SiO_2$, $TiO_2$, $Al_2O_3$) or hybrid compounds (e.g., metal-organic frameworks—MOFs) with a consequent improvement in their photo, air, moisture and thermal stabilities.

Polymers were demonstrated to protect LHPs from moisture or water, but they have a weak thermal resistance.

MOFs can provide thermal- and photo-stability, but cannot provide efficient protection against water. In addition, the reported PLQYs of LHPs/MOFs composites are ~62% or lower, which is not enough for the commercial standards required for optoelectronic devices.

On the other hand, inorganic matrixes, and in particular metal oxides, thanks to their robustness, have the potential to ensure both thermal and water stability to LHPs, while preserving their high PL emission.

Among the different inorganic matrixes, mesoporous silica (m-$SiO_2$) is one of the best candidates for the encapsulation of LHPs for the following reasons: i) it is non-toxic, earth abundant, and cheap; ii) it has an excellent chemical and thermal stability; iii) its surface can be easily functionalized (to make it hydrophilic or hydrophobic); iv) the size of the pores can be finely tuned (from 2 to 50 nm). In fact, m-$SiO_2$ has been successfully employed as a matrix, with LHPs NCs having been grown inside its cavities/pores, following various approaches (see Dirin et al. Nano Lett. 2016, 16, 9, 5866-5874 and Chen et al. Nanoscale, 2019, 11, 16499). The resulting composites exhibited a bright PL emission (with the maximum PLQY achieved being 83%) and featured enhanced stability against photon irradiation, humidity, and high temperature (100° C.) In addition, by selecting m-$SiO_2$ having a desired pore size, the size of the LHPs NC growing inside the pores can be easily adjusted in order to control the emission wavelength.

Overall, the reported encapsulation procedures are not capable of delivering LHP based composites exhibiting a high PLQY (at least 80%) and, at the same time, a high stability under photon irradiation, heat, and when fully immersed in water. For this reason, the LHP/$M_xO_y$ composites produced so far are still not able to meet the requirements to be employed as phosphors in optoelectronic devices such as displays (LCD backlighting, color converting filters in OLED and μLED), light emitting diodes, sensors (X-ray scintillators, UV sensors etc.) and solar cells.

Accordingly, there is a need for novel methods to produce metal halide nanocomposites without the drawbacks of the already known methods.

OBJECT OF THE INVENTION

The aim of the present invention is to provide a novel method to produce metal halide nanocomposite materials with a strong PL emission and that are highly stable.

The aforementioned objective has been met according to the method of claim 1 and to a nanocomposite according to claim 13 and its use according to claims 14 and 15. Preferred embodiments are set out within the dependent claims. In particular, it is provided a method for the preparation of luminescent nanocomposites comprising metal halide nanocomposites nanocrystals co-embedded with inorganic salts in the pores of a porous metal oxide matrix comprising the steps of:

a) preparing a mixture comprising at least a metal halide, a combination of inorganic salts, and porous metal oxide particles in the absence of an organic solvent;
b) heating above the melting temperature of the mixture of step a);
c) cooling to obtain the nanocomposite.

The method of the invention allows for the preparation of nanocomposite materials composed of porous metal oxide particles, for example mesoporous $SiO_2$ (m-$SiO_2$), whose pores are filled for example with light emitting metal halide nanocrystals (for example $CsPbBr_3$) and other organic and/or inorganic salts (e.g. $KNO_3$, NaBr) coming from the molten salt mixture in which the preparation is carried out. The invention involves the use of a mixture of organic and/or inorganic salts (molten salts) as the synthesis medium, in which the reaction occurs. The molten salts medium not only enables the formation of NCs, but also allows for their nucleation and growth inside the m-$SiO_2$ pores without the use of any organic solvent or surfactants. In addition, the m-$SiO_2$ pores in the final composite can be either partially or completely sealed, depending on the specific molten salts employed. This, in turn, results in nanocomposites having very high PLQY values (around 90%) and, at the same time, an excellent stability against moisture, photon irradiation, heat, and water.

Furthermore, the method of the invention has a universality and can be utilized to fabricate various types of nanocomposites such as metal halide, metal oxide, metal chalcogenide or metal pnictide embedded in different matrixes. Particularly, the composite obtained with the method of the invention has luminescence properties.

The obtained nanocomposites can be utilized as color down-converting materials in optoelectronic devices: displays (LCD backlighting, color converting filters in OLED and μLED), light emitting diodes, sensors (X-ray scintillators, UV sensors etc.) and solar cells.

Moreover, the very high stability (against water, acid treatment and high temperature) of these nanocomposites makes them optimal candidates as tracers and tags for oil industry, a new emerging field. In upstream oil industry, the composites can be used as oil tracers for detecting hydrocarbon flow paths during crude oil extraction. In midstream and downstream oil industry, the composites can be used as security tags of crude oil and refined products through production, refining, shipping, storage, transportation and distribution stages.

According to one embodiment of the invention, metal halide can be selected from the group consisting of CsBr, CsCl, $PbBr_2$, $PbCl_2$, CsI, $PbI_2$ or mixture thereof, preferably a mixture of CsBr and $PbBr_2$ (to produce perovskite $CsPbBr_3$).

The inorganic salts, constituting the molten salts mixture, can be selected from the group consisting of inorganic compounds of formula $M_aX_b$ or mixture thereof, wherein M represents one or more metal cations selected from Li, Na, K, Rb, Cs, Mg, Ca, Sr, Ba, Al, Ce, Co, Fe, Mn, La, Ni; X represents one or more anions selected from the group consisting of halide, nitrate, nitrite, perchlorate, carbonate, thiocyanate, sulfate, sulfite, phosphate and phosphite; a and b are independently an integer ranging from 1 to 3.

Preferably, inorganic salts can be selected from the group consisting of $KNO_3$, KBr, KCl, $NaNO_3$, KBr, NaBr, LiBr, RbBr, or mixture thereof, more preferably a mixture of $KNO_3$ and KBr or a mixture of $KNO_3$, $NaNO_3$ and KBr.

In a preferred embodiment the molten salt mixture is a mixture of $KNO_3$:$NaNO_3$:KBr (in a molar ratio of 10:5:5) as the molten salts medium. The resulting nanocomposites had an enhanced stability against water, due to the complete sealing of the pores which occurs thanks to this specific combination of molten salts. The closure of the pores can be inferred from the exceptional stability of the nanocomposites which do not degrade neither when immersed in aqua regia (a mixture of nitric acid and hydrochloric acid) for 3 days (FIG. 5).

In an alternative embodiment, good results are also obtained, when working with a mixture of $KNO_3$ and KBr ($KNO_3$:KBr molar ratio of 15:5) at 350° C. (melting temperature of this specific salt mixture) to obtain a metal halide nanocomposite. In this case, the pores of the metal oxide particles result to be partially closed.

In an embodiment, porous metal oxide particles are mesoporous metal oxide particles. Porous metal oxide particles can be selected from the group consisting of silica particles, aluminum oxide particles, titanium oxide particles, zinc oxide particles and zeolite particles, preferably mesoporous silica particles. Preferably, the mesoporous metal oxide particles have a particle size equal or below 1 μm.

After the step of cooling, the method of the invention can provide for a step d) of washing the nanocomposite obtained from step c) with a polar solvent, preferably selected from the group consisting of water, dimethylsufoxide and dimethylformamide, more preferably water.

Moreover, the method of the invention can further comprise the step e) of drying the nanocomposite of step d).

The present invention provides a way to produce nanocomposites made of strongly emissive metal halide nanocrystals co-embedded with inorganic salts in the pores of a mesoporous metal oxide matrix. The resulting products exhibit strong PL emission and are highly stable.

Advantageously, the composite is prepared in a single reaction step by preparing a mixture of precursors needed to prepare the emitting nanocrystals (for example, CsBr and $PbBr_2$ for perovskite $CsPbBr_3$), a mixture of salts that will form a melt (also known as molten salts) at the desired reaction temperature, and the desired mesoporous metal oxide particles. The resulting powder is then heated up to the melting point of the salts mixture, for example in a furnace, for 60 min, under ambient conditions. Afterward, the product is removed from the furnace and is naturally allowed to cool down to room temperature, resulting in a monolith. Then, the monolith can be washed with a polar solvent to isolate the metal oxide particles from inorganic salts and any light emitting crystals present outside the pores of the metal oxide particles (for example bulk-like $CsPbBr_3$ crystals, which are highly soluble in polar solvents). The remaining powder can be dried in vacuum oven at 40° C., after which it is ready for further characterization or for application in devices fabrication.

The reaction can occur only above the melting temperature of the mixture of salts that is employed, in other words, only when the salt mixture becomes liquid. The melting temperature of a mixture of salts, in turn, can be controlled by the selection of the inorganic salts and their molar ratio. This procedure leads to an optimal composite product.

Given the relatively low reaction temperature, the structure and size of the metal oxide particles is preserved at the end of the reaction: metal oxide particles are not fusing together or irreversibly aggregating and the pores do not collapse. This, in turn, allows for optimizing the optical properties of the composites: if the size of metal oxide particles is small enough (1 μm or smaller) it is possible to excite all the $CsPbBr_3$ NCs inside the metal oxide particles (considering that the excitation wavelengths are typically in the UV or blue region of the spectrum) and, at the same time, to minimize self-absorption phenomena. As an example, $CsPbBr_3/SiO_2$ composites having a bulky $SiO_2$ matrix require etching treatments (HF etching) in order to optimize their PL emission (see Q. Zhang et al., Nat. Commun., vol. 11, no. 1, pp. 1-9, 2020). On the contrary, the nanocomposite obtained with the method of the invention does not require any post-synthesis etching procedure.

The use of molten salts is also considered to be responsible for the partial sealing of the pores of the metal oxide particles, and is therefore of utmost importance to confer high stability to the final nanocomposite material. The fact that the pores are partially closed can be inferred from the stability of the nanocomposites obtained with the method of the invention: they can be washed with water and they retain their PL emission for days when immersed in water. On the contrary, in other publications in which $CsPbBr_3$ NCs have been grown inside m-$SiO_2$ without the use of molten salts, the resulting compounds could not sustain any washing step with water since the washing step leads to the dissolution of crystals inside the pores (see P. Chen et al., Nanoscale, issue 35, pp. 16499-16507, 2019; D. N. Dirin et al., Nano Lett., vol. 16, no. 9, pp. 5866-5874, 2016; and Q. Zhang et al., Nat. Commun., vol. 11, no. 1, pp. 1-9, 2020). In yet another work, Zhang et al. observed that sealing of the $SiO_2$ pores can be achieved only at temperatures as high as 700° C. when working in the absence of molten salts (Q. Zhang et al., Nat. Commun., vol. 11, no. 1, pp. 1-9, 2020). Indeed, the corrosiveness of alkali salts to various metal oxides has been known for decades. In this regard, the etching effect of molten salts has been even used to design mesoporous structures starting from bulk non-porous metal oxides. Notably, mesoporous silica, as emerged from several studies, is particularly reactive towards molten salts.

In the following, the present invention shall be illustrated by means of some examples, which are not construed to be viewed as limiting the scope of the invention.

BRIEF DESCRIPTION OF THE DRAWINGS

The present invention will be described in detail with reference to the figures in the annexed drawings, which show purely illustrative and non-exhaustive examples in which.

DETAILED DESCRIPTION OF THE INVENTION

Example

Example 1

Preparation of Emissive LHP-Salt-Silica Composite

A mixture of CsBr, PbBr, $KNO_3$ and KBr (molar ratio of 1:1:15:5), and mesoporous silica (commercial name MCM-41, Sigma Aldrich code 643645), having particles size of ~1 μm with a very broad size distribution, and pores size of 3.3 nm, were mixed in a ceramic crucible and heated up to 350° C. in a furnace for 60 minutes under air. The resulting product was allowed to cool down to room temperature, forming a monolith which was washed with a polar solvent (preferably water, but other solvents such as dimethylsufoxide (DMSO) or dimethylformamide (DMF) can be also used, with no major differences in optical, structural and chemical properties of the final product) in the following way: 100 mg of product was loaded in a vial with 1 ml of water and sonicated for 10 min, centrifuged at 5000 rpm, and the supernatant was discarded. This procedure was repeated 5 times in order to quantitatively remove all the inorganic salts and all the $CsPbBr_3$ crystals that had formed outside of the m-$SiO_2$ particles. The final powder was eventually dried in a vacuum oven at 40° C., delivering ~90 mg of final $CsPbBr_3$-salt-silica composite. The synthesis yield is around 90%.

The obtained composite presents partially sealed $SiO_2$ pores.

Example 2

XRD and PL/Abs Characterization of $CsPbBr_3/KNO_3/SiO_2$ Nanocomposites

Figure 1A:
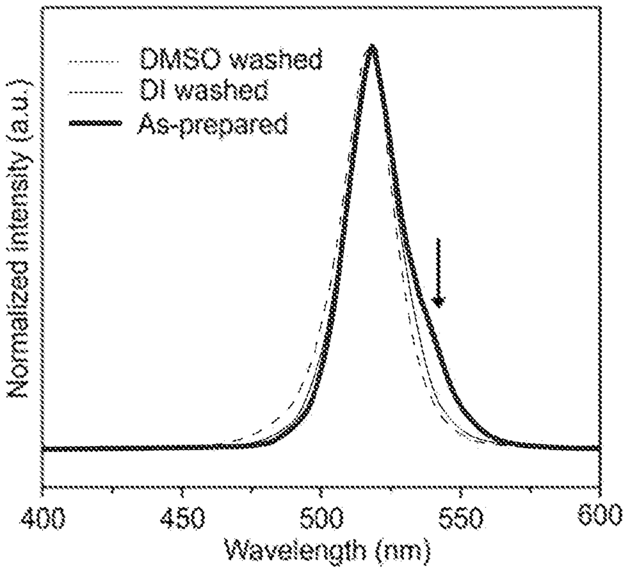
FIG. 1 illustrates (a) PL spectra of $CsPbBr_3$-salt-silica composites before (thick solid curve) and after different washing steps: cleaning with the use of deionized (DI) water (solid curve); DI water followed by DMSO (dashed curve). An arrow indicates the PL emission corresponding to bulk $CsPbBr_3$; (b,c) XRD pattern of $CsPbBr_3$-salt-silica composites obtained after one washing step with water (b) and after a subsequent washing step with DMSO (c). The bulk reflections of PbBrOH (ICSD 98-002-83-13), $CsPbBr_3$ orthorhombic (ICSD 98-009-7851) and $KNO_3$ cubic (ICSD 98-000-0384) are reported by means of vertical bars.

The product of Example 1, before the washing step, showed a PL emission peak at 520 nm, arising from the $CsPbBr_3$ NCs inside the m-$SiO_2$, with a shoulder at longer wavelengths, which was attributed to the presence of bulk-like perovskite crystals located outside the m-$SiO_2$ matrix (see FIG. 1*a*). After the washing steps with water, the PL emission of the resulting sample was peaked at 520 nm without a shoulder at lower energies, full width at half maximum (FWHM) of 22 nm (102 meV) and a PLQY as high as 87%.

Figure 1B:
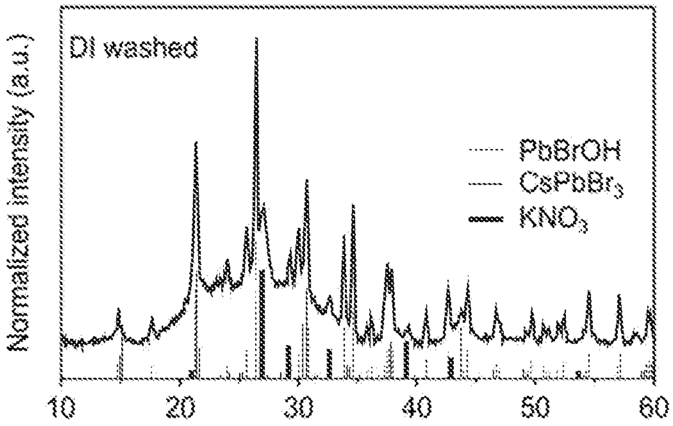
Figure 1C:
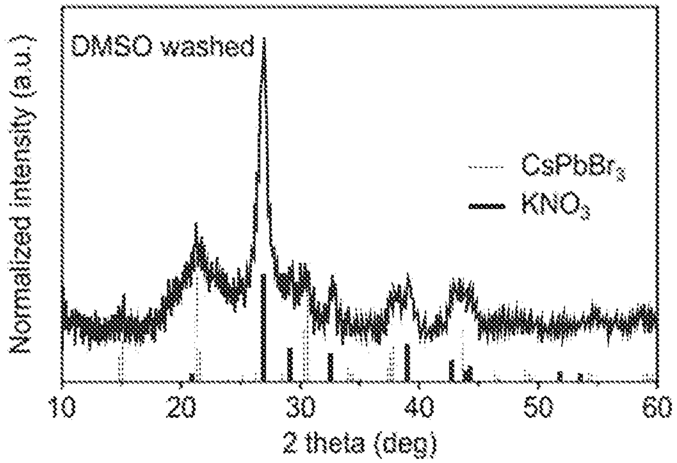

The XRD pattern of the product after the cleaning with water is dominated by the peaks of the PbBrOH phase which, most likely, formed upon the reaction of Pb—Br compounds with water and which is insoluble in water (FIG. 1*b*). Minor reflections ascribable to $KNO_3$ are also observed. On the other hand, it is not possible to assess if any $CsPbBr_3$ phase is present as the corresponding reflections are covered by those of the PbBrOH phase. Thus, in order to have a more clear structural analysis, the composites was cleaned with DMSO, which does not lead to the formation of hydroxide compounds. The inventors highlight here that this washing method results in a final product having the same PLQY of that obtained by cleaning with water. The XRD pattern of the DMSO washed product indicated the absence of the PbBrOH phase and the presence of orthorhombic $CsPbBr_3$ (ICSD 98-009-7851) and $KNO_3$, most likely filling silica pores together with $CsPbBr_3$ NCs (FIG. 1*c*). A broad peak ranging from 15° to 35° was ascribed to the $SiO_2$ matrix, which was amorphous (see FIG. 1*b*).

Example 3

Electron Microscopy, EDS and HAADF Characterization

Figure 2C:
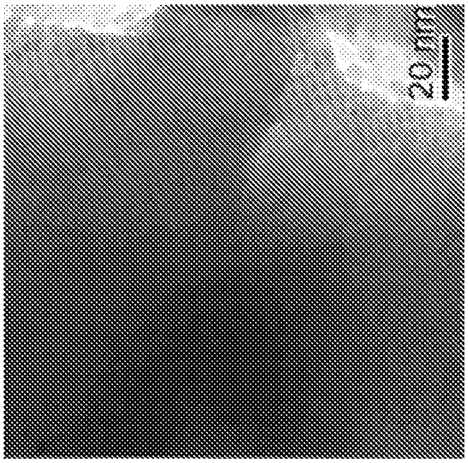
FIG. 2 illustrates a) TEM image of the empty m-$SiO_2$ MCM-41 template; b-c) TEM images of the $CsPbBr_3$—$KNO_3$/m-$SiO_2$ nanocomposites.
Figure 2B:
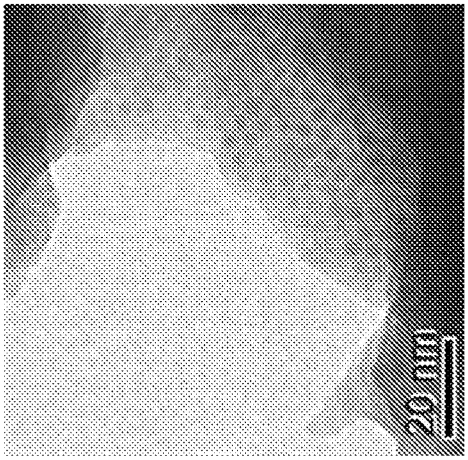
Figure 2A:
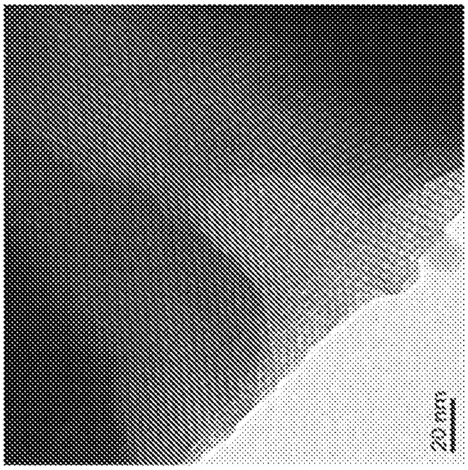

To better understand the morphology and the nanostructure of the $CsPbBr_3/KNO_3/SiO_2$ product of Example 1, the inventors performed an in-depth TEM characterization. High-resolution (HR) TEM analysis revealed that the mesoporous nature of the $SiO_2$ was preserved after the molten salts synthesis procedure, with pores having a mean diameter of 3.3 nm (FIGS. 2*a-c*). Moreover, it was possible to assess that the product of the method of the invention, after washing, was composed of m-$SiO_2$ particles whose pores were filled with small NCs (FIGS. 2*b-c*). Scanning transmission electron microscopy (STEM) energy dispersive X-ray spectrometry (EDS) analysis indicated the presence of inorganic NCs containing Cs, Pb, Br and K inside the pores of m-$SiO_2$, in agreement with our XRD results, and no presence of undesired inorganic particles outside the m-$SiO_2$.

Example 4

Stability Test

Figure 3C:
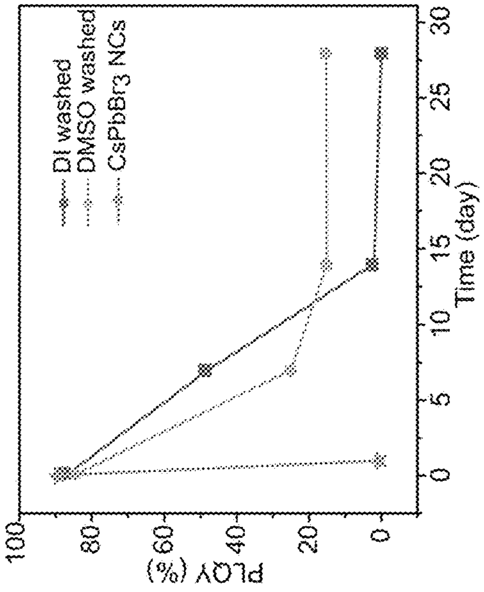
FIG. 3 illustrates (a) DLS curves obtained for starting m-$SiO_2$ particles and $CsPbBr_3$-salt/m-$SiO_2$ composites prepared using $KNO_3$:KBr (in a molar ratio of 15:5) and dispersed in water; (b) PLQY of $CsPbBr_3$-salt/m-$SiO_2$ composites washed with either DI water or DMSO, and bare $CsPbBr_3$ NCs before (I) and after annealing at 180° C. in Argon for 3 h (II) or 2 h (II'); (c) Time-dependent absolute PLQY of $CsPbBr_3$-salt/m-$SiO_2$ composites (washed with either DI water or DMSO) and $CsPbBr_3$ NCs immersed in 100% water.

In order to assess if the m-$SiO_2$ particles aggregate or merge during the production of the composites, the inventors tested the method of the invention by employing a commercial m-$SiO_2$ particles (Sigma Aldrich code 748161) having a mean diameter of 200 nm with a spherical shape and 4 nm pore size. This because MCM-41 m-$SiO_2$, used in the experiment disclosed above, is characterized by a broad size distribution, making it hard to assess if aggregation occurs after the composites preparation. The dynamic light scattering (DLS) analysis, performed by dispersing m-$SiO_2$ or $CsPbBr_3$-salt/$SiO_2$ particles in water, clearly indicated that the method of the invention does not lead to any aggregation or merging of $SiO_2$ particles (FIG. 3*a*), contrarily to what happens when working in the absence of molten salts at higher temperatures (Q. Zhang et al., Nat. Commun., vol. 11, no. 1, pp. 1-9, 2020).

$CsPbBr_3$/m-$SiO_2$ composites prepared using $KNO_3$:KBr (in molar ratio of 15:5), made with MCM-41 m-$SiO_2$, and washed by using either water or DMSO were subjected to various tests in order to assess their stability under heating (thermal stability) or to water exposure (water stability). The bare $CsPbBr_3$ NCs obtained via a standard colloidal approach (reference standard) were also tested in parallel (L. Protesescu et al. Nano letters 15.6 (2015): 3692-3696).

Figure 3B:
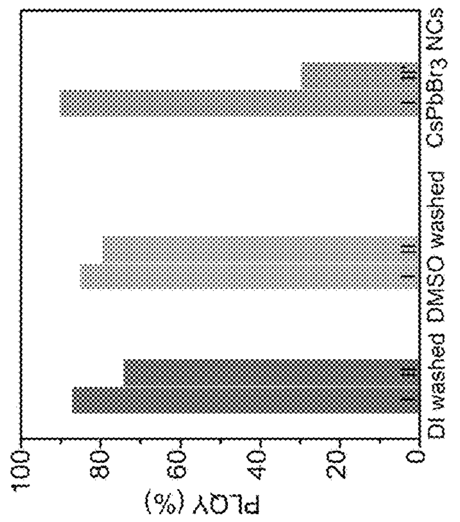
Figure 3A:
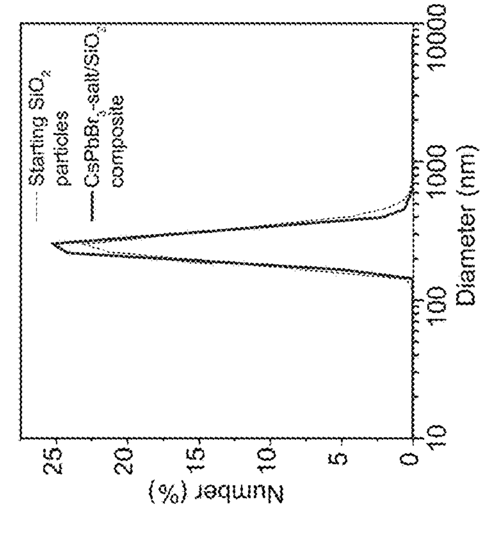

The thermal stability was assessed by monitoring the variation of the PLQY of the sample before and after annealing at 180° C. for 3 h in argon atmosphere. The PLQY of the composites went from ~85-87% to ~75-80%, whereas the PLQY of the bare $CsPbBr_3$ NCs dropped from 90% to 30% after annealing at 180° C. in argon for 2 h. (FIG. 3*b*)

The stability against water was assessed by dispersing the samples in deionized water and monitoring the resulting PLQY over time. As shown in FIG. 3*c*, the $CsPbBr_3$-salts/m-$SiO_2$ composites showed very slow PLQY decrements compared to the bare NCs. The PLQY of the composites obtained with the method of the invention was still around 50% after 7-8 days upon immersion in water (FIG. 3*c*). On the other hand, the $CsPbBr_3$ NCs could not survive in water and their PL was completely quenched after only several minutes. The results indicated that, the molten salts were responsible of a partial sealing of the pores of m-$SiO_2$, reason why the composites could be washed in water and their degradation under water was strongly reduced. Indeed, the salts present in the pores ($KNO_3$) together with $CsPbBr_3$ NCs, are soluble in water, and, are not able to protect the perovskite emitters.

Example 5

Extension of the Invention to Different Compositions

The method of the invention can be used for the production of $CsPbX_3$ NCs with mixed halide compositions. In details, the inventors employed a mixture of $PbCl_2$/$PbBr_2$, CsBr/CsCl, molten salts ($KNO_3$ and a mixture of KBr/KCl) and m-$SiO_2$ for the preparation of $CsPb(Cl,Br)_3$—$SiO_2$ composites.

Figure 4:
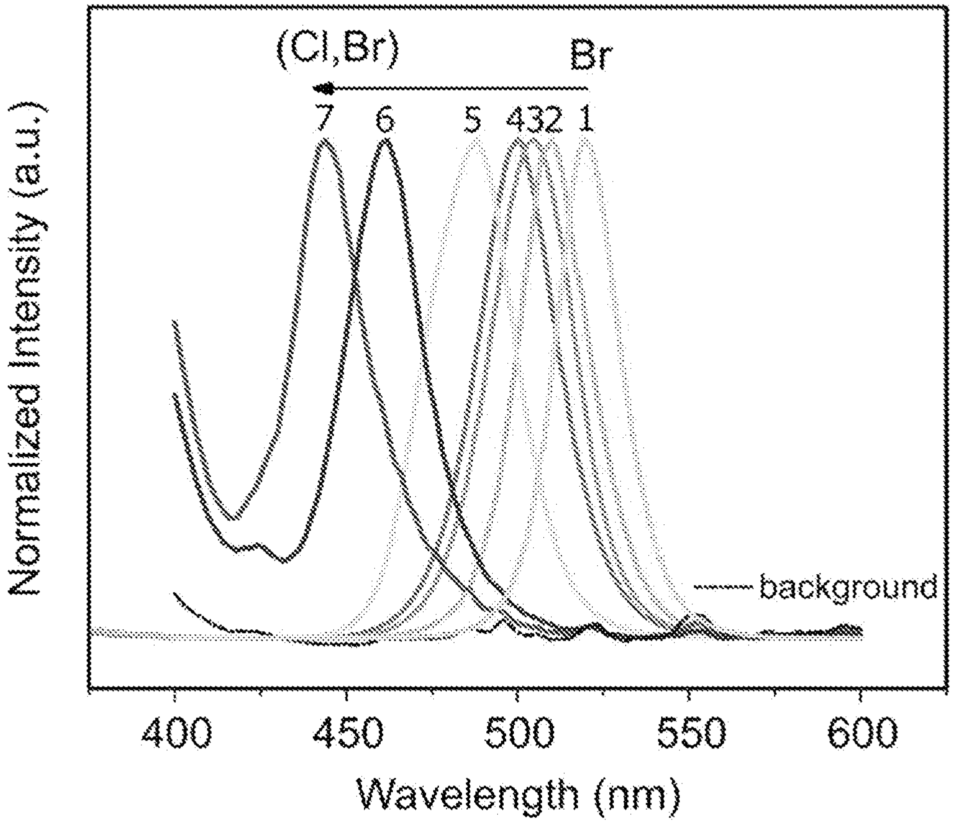
FIG. 4 illustrates PL spectra of $CsPb(Cl,Br)_3$ based composites with the PL tunable of from 520 nm (curve 1) to 443 nm (curve 7) by varying the halide composition.
Figure 5:
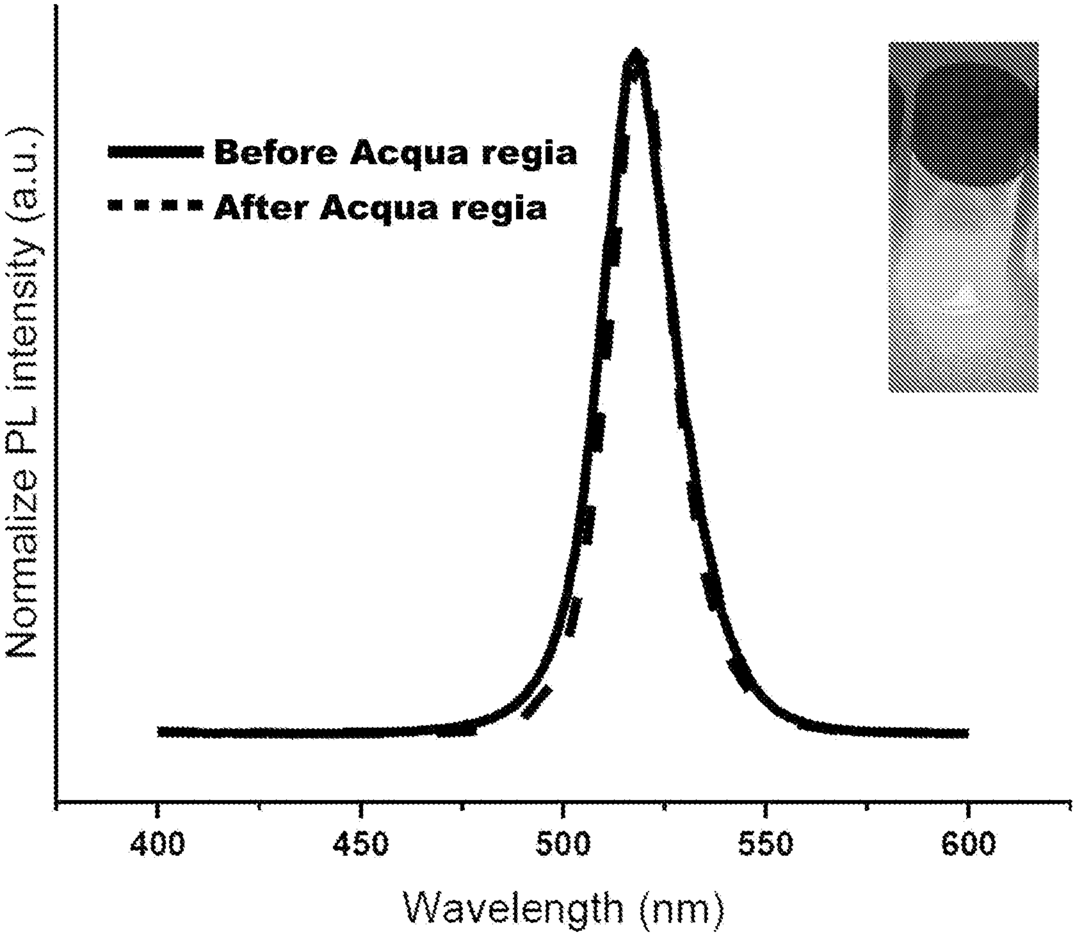
FIG. 5 illustrates PL spectra of a metal halide nanocomposite prepared using $KNO_3$:$NaNO_3$:KBr (in a molar ratio of 10:5:5) as the molten salts medium, before and after immersion in aqua regia.

A mixture of CsBr, CsCl, $PbBr_2$, $PbCl_2$, KBr, KCl and $KNO_3$ was prepared in a ceramic crucible and heated up to 350° C. in a furnace for 60 minutes under air. After cooling down to room temperature, the formed monolith was washed with water and then, was dried in a vacuum oven at 40° C. to result final composite powder. Depending on the specific inorganic salts ratio different sample having different halide composition and consequently different emission wavelengths could be prepared (FIG. 4). In details, the samples with a PL emission from 500 nm to 510 nm were prepared using a CsBr:($PbBr_2$+$PbCl_2$):Kbr ratio of 1:1:5 where the $PbBr_2$:$PbCl_2$ ratio was varied from 0.11:0.89 to 0.33:0.67. The samples emitting from 487 to 443 nm were prepared using CsCl:$PbCl_2$:(KBr+KCl) of 1:1:5 where the KBr:KCl ratio was varied from 5:0 to 2.5:2.5.

Example 6

Preparation of Nanoparticles of Emissive LHP-Salt-Silica Composite in Customized m-$SiO_2$ Emissive LHP-salt-silica composite was also synthesized in customized m-$SiO_2$. The customized m-$SiO_2$ is composed of particles having an overall smaller average size compared to commercial one. The TEM analysis revealed that the average size of synthesized m-$SiO_2$ particles is about 100 nm. (Figure x) Smaller size of m-$SiO_2$ particles will expand the range of applications of the resulting nanocomposites, especially in those fields where small emissive composites, ideally not affected by scattering effects, are required, such as color conversion in display and lighting.

This Functionalized Nanocomposite samples are prepared in three steps:

1) Synthesis of m-$SiO_2$ nanoparticles. 1 g of Cetyltrimethylammonium bromide (CTABr) is dissolved in 480 ml of distilled water under string in a flask. Then, 3.5 ml of NaOH (2 M in distilled water) is added to flask and the resulting mixture is heated to 70° C. for 1 h. Subsequently, 5 ml of tetraethoxysilane is injected into mixture at a 10 ml/min injecting speed. The mixture is stirred for 2 h at 70° C., and the resulting product is washed five times with distilled water. 700 mg of products is eventually calcined at 550° C. for 5 h to remove the CTABr template phase.

2) Growth of $CsPbBr_3$ inside the pores of $SiO_2$. CsBr (0.6 mmol), $PbBr_2$ (0.6 mmol), KBr (0.5 mmol), KNOB (1 mmol), $NaNO_3$ (0.5 mmol) and m-$SiO_2$ (0.5 mmol) are mixed via grinding with a mortar and pestle. Then, the mixture is heated in a crucible at 320° C. for 60 minutes under air and allowed to cool down to room temperature (it is also possible to run the reaction at 330 or 340° C.). The final $CsPbBr_3$/$SiO_2$ composites are cleaned with DMSO and ethanol 3 times.

3) Surface functionalization of the composites. 9 mg of nanocomposites are suspended in 5 mL of octadecene under stirring at 70° C. An excess of trimethoxy(octadecyl)silane (42 μl, 0.1 mmol) is added to the suspension which is stirred (at 70° C.) for 4 hours. The resulting solid product is isolated by centrifugation and then washed with anhydrous toluene three times.

Figure 8:
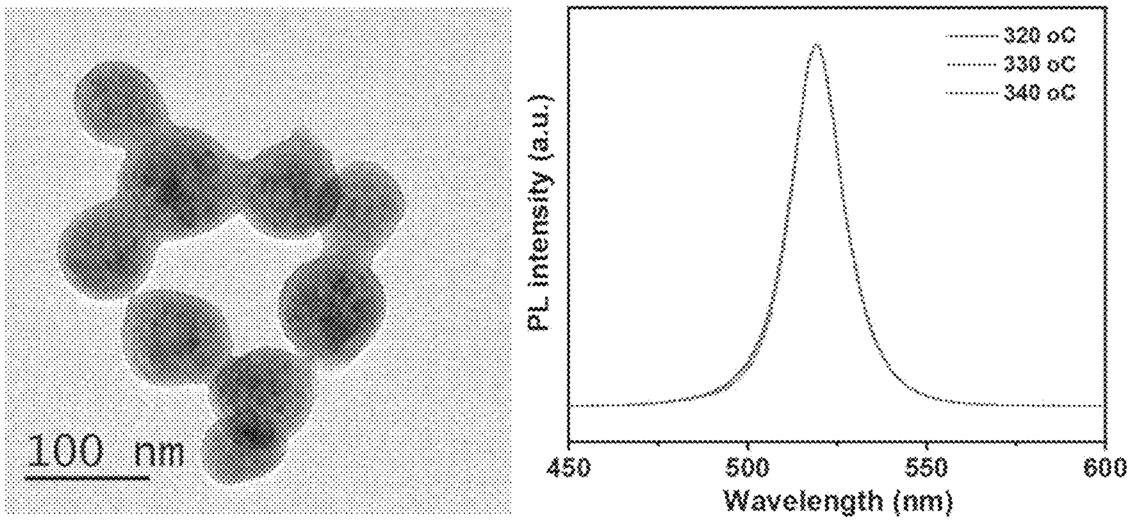
FIG. 8 illustrates the TEM image of the $CsPbBr_3/SiO_2$ nanocomposite synthesized at 320° C. PL emission of $CsPbBr_3/SiO_2$ nanocomposites synthesized at 320° C., 330° C. or 340° C.

TEM image of the $CsPbBr_3$/$SiO_2$ nanocomposite synthesized at 320° C. and PL emission of $CsPbBr_3$/$SiO_2$ nanocomposites synthesized at 320° C., 330° C. or 340° C. are illustrated in FIG. 8.

Example 7

Stability Tests in Polymer Films

The emissive LHP-salt-silica composite reported in the example 6, was subjected to stability tests in polymer films for colour conversion applications.

To produce a polymer film containing emissive LHP-salt-silica composite material, the emissive LHP-salt-silica particles were dispersed in IBOA (Isobornyl acrylate monomer) together with a certain amount of a photoinitiator, $TiO_2$ nanoparticles, acting as a light scattering agent, and $SiO_2$ nanoparticles, acting as a viscosity modifier. The concentration of nanocomposite particles was kept at 0.5 wt %. The mixture was blade coated in between barrier films (3M™ FTB3-50 with 50 μm thickness and VWTR<0.001 g/m$^2$-day@20° C.) and cured under UV light (800 mW/cm$^2$ light intensity) for 1 minute. The formed film had a total thickness of 300 μm. The resulting polymer composite was characterized by an emission peak centered at 522 nm with a FWHM 18 nm and a PLQY of ~62%.

Figure 6:
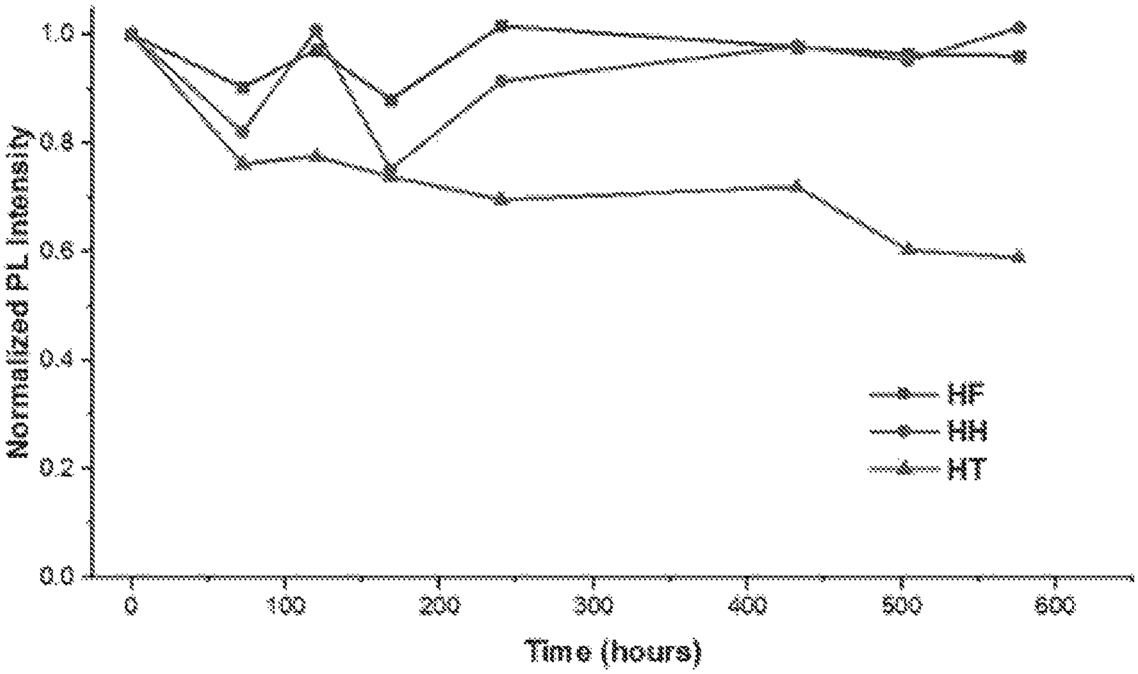
FIG. 6 illustrates the normalized PL intensity of the composite of the invention recorded during different type of accelerated test conditions (HF=High Flux, HH=High Humidity, HT=High Temperature).

The obtained emissive polymer composite films were tested under High Flux (HF), High Humidity (HH) and High Temperature (HT), also called accelerated reliability tests. High flux test consists in exposing the composite film under 100 mW/cm$^2$ of blue light (450 nm wavelength) and 60° C. High humidity test is done by exposing the composite film to an environment with 90% RH at 60° C. High temperature test is done by exposing the composite film to 10 mW/cm$^2$ of blue light (450 nm wavelength) at 60° C. In all these accelerated test conditions, the film need to maintain more than 50% from its original PL intensity. Results are illustrated in FIG. 6.

During the accelerated test, the emission intensity of the films was monitored and recorded. FIG. 6 below shows the variation of the PL intensity of the films under the three tests as a function of the test time. The composite films show stable PL intensity under these harsh condition for more than 500 hours.

Thanks to their high stability, the emissive composite films could be used for color conversion in displays. For this application, the emissive LHP-salt-silica composite will down convert the blue light to green to obtain white light (RGB color) when combined with magenta LED backlight. as shown in FIG. 7.

Figure 7:
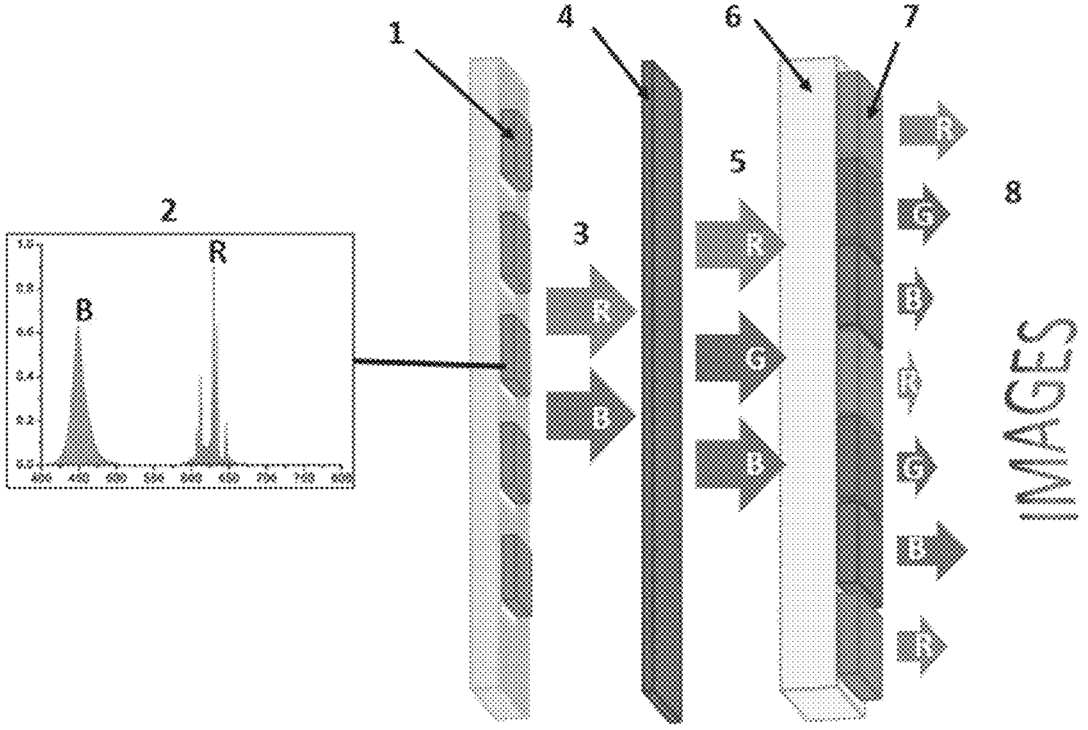
FIG. 7 illustrates the schematic of the LCD device: 1—light source with pink color, 2—the spectra of the light source, 3—representation of red (marked as "R", which is 630 nm wavelength's peak) and blue light (marked as "B", which is 450 nm wavelength's peak), 4—polymer film with luminescent nanocomposites of present disclosure, 5—representation of red (R), green (G) and blue (B) light, 6—LCD matrix, 7—color filters, 8—resulting images.

FIG. 7 illustrates one embodiment of display device. The polymer composite with the emissive LHP-salt-silica composite 4 is used to down convert blue light 3 from the pink LED source, which emits blue (450 nm) and red (630 nm) spectrum 1. The part of blue light is converted into green light with emission center >522 nm and FWHM<25 nm and the red emission just pass through the polymer composite.

The resulting three RGB colors 5 are passing through LCD matrix 6 and then color filters 7 giving the image 8.

The invention claimed is:

1. A method for a preparation of luminescent nanocomposites comprising metal halide nanocrystals co-embedded with inorganic salts in pores of a porous metal oxide matrix comprising the steps of:

a) preparing a mixture comprising at least a metal halide, a combination of inorganic salts wherein said inorganic salts are selected from the group consisting of $KNO_3$, KBr, KCl, $NaNO_3$, KBr, NaBr, LiBr, RbBr, and mixtures thereof, and porous metal oxide particles in the absence of an organic solvent;

b) heating above a melting temperature of the mixture of step a); and c) cooling to obtain the nanocomposite.

2. The method according to claim 1, wherein said metal halide is selected from the group consisting of CsBr, CsCl, $PbBr_2$, $PbCl_2$, CsI, $PbI_2$, and mixtures thereof.

3. The method according to claim 2, wherein said metal halide is a mixture of CsBr and $PbBr_2$.

4. The method according to claim 1, wherein said inorganic salt is selected from a mixture of $KNO_3$ and KBr or a mixture of $KNO_3$, $NaNO_3$ and KBr.

5. The method according to claim 1, wherein said porous metal oxide particles are mesoporous metal oxide particles.

6. The method according to claim 1, wherein said porous metal oxide particles are selected from the group consisting of silica particles, aluminum oxide particles, titanium oxide particles, zinc oxide particles and zeolite particles.

7. The method according to claim 5, wherein said mesoporous metal oxide particles have a particle size equal to or less than 1 pm.

8. The method according to claim 5, wherein said mesoporous metal oxide particles are m-$SiO_2$.

9. The method according to claim 1, further comprising a step d), wherein step d comprises washing said nanocomposite obtained from step c) with a polar solvent.

10. The method according to claim 9, wherein said polar solvent is selected from the group consisting of water, dimethylsulfoxide and dimethylformamide.

11. The method according to claim 9, further comprising a step e), wherein step e comprises drying the nanocomposite of step d).

12. A luminescent nanocomposite obtained with the method according to claim 1.

13. An optoelectronic device comprising the nanocomposite of claim 12.

14. A tracer and tagging material for oil industry comprising the nanocomposite of claim 12.

15. A polymer film containing luminescent nanocomposite obtained with the method according to claim 1.

* * * * *